United States Patent Office 2,911,441
Patented Nov. 3, 1959

2,911,441

TETRACYCLINE AND CHLORTETRACYCLINE QUATERNARY ALKYLHALIDES

Guido E. Bonvicino, Pearl River, N.Y., and James H. Boothe, Montvale, N.J., assignors to American Cyanamid Company, New York, N.Y., a corporation of Maine No Drawing. Application August 21, 1956
Serial No. 605,436

4 Claims. (Cl. 260—559)

This invention relates to chlortetracycline and tetracycline derivatives. More particularly, this invention relates to quaternary alkylhalides of chlortetracycline and tetracycline, reaction products thereof and methods of preparing the same.

For example, of the new quaternary halides of this invention, chlortetracycline methiodide is an amine base which is believed to be best represented by the following structural formula:

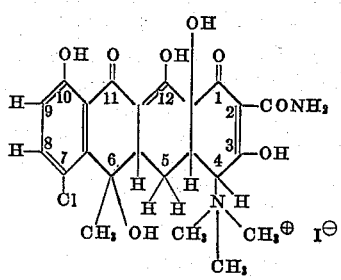

The tetracycline alkylhalides possess a similar configuration with the proviso that there is a hydrogen substituent at the 7 position.

The new quaternary alkylhalides of chlortetracycline and tetracycline are useful as intermediates for a large number of other chlortetracycline and tetracycline derivatives. For example, tetracycline methiodide illustrated above may be converted to either tetracycline methyl betaine or desdimethylamino tetracycline, among others, as is illustrated by the following equation:

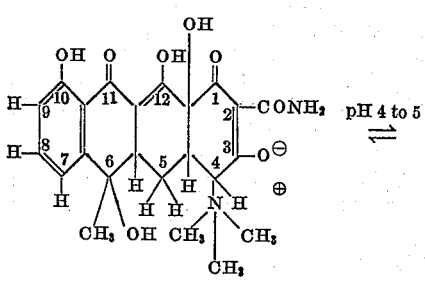

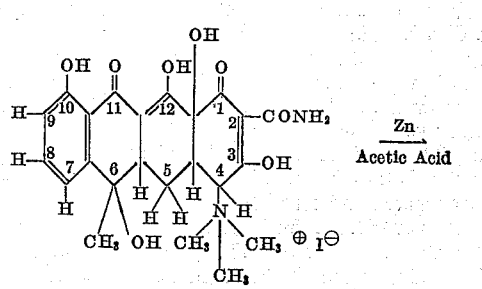

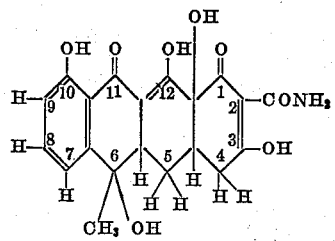

Similar derivatives of chlortetracycline can be made in the same manner. All of the compounds set out in the above equation are new compounds; similarly, new chlortetracycline compounds have been discovered. In a like manner, the methods of preparing these new compounds are deemed to be new. The new compounds of this invention are also useful as anti-bacterial agents; for example, desdimethylamino tetracycline is particularly useful against bacteria which are resistant to tetracycline. This is illustrated by the following procedure and table:

The tetracycline derivatives were dissolved in dimethylformamide to a concentration of 10 mg./ml. These solutions were sterile-filtered by passing them through an ultra-fine sintered glass filter. Portions of the resulting sterile solutions were diluted ten-fold with sterile distilled water, from which point sterile two-fold dilutions in water were continued. One ml. aliquots of each of these dilutions were transferred to 4 empty sterile tubes. Flasks of medium inoculated with the test cultures and 9 ml. aliquots of the inoculated media were added to the respective sets of tubes. The completed racks of tubes were incubated at 37° C. After 4 hours, 8 hours, and 24 hours the turbidity of each tube was measured turbidimetrically. The growth data were plotted and concentrations inhibiting to the one-half maximal point were determined by interpolation.

TABLE 1

HMI [1] in γ/Ml.

| | 4 Hours | 8 Hours | 24 Hours |
|---|---|---|---|
| Streptococcus pyogenes, γ hemolytic | | | |
| Tetracycline HCl | 22.2 | 65.5 | >100 |
| Desdimethylaminotetracycline | 8.25 | 16.7 | 75.0 |
| Streptococcus pyogenes, β hemolytic | | | |
| Tetracycline HCl | 25.0 | >100 | >100 |
| Desdimethylaminotetracycline | 4.10 | 11.4 | 33.5 |
| Staphlococcus albus | | | |
| Tetracycline HCl | 40.0 | 84.0 | >100 |
| Desdimethylaminotetracycline | 4.5 | 7.65 | 13.8 |

[1] Half Maximal Inhibition—minimal amount of antibiotic which inhibits growth of the organism by 50% of maximal inhibition.

In preparing the quaternary alkylhalides of this invention, the free base of either tetracycline or chlortetracycline is reacted at a suitable temperature with the corresponding alkylhalides in a suitable solvent. When making chlortetracycline methiodide for example, the temperature may be varied over a wide range, e.g. it may be reacted with methyl iodide at room temperature (24° C.) for several days; on the other hand, the methiodide of chlortetracycline can be produced by autoclaving or refluxing at about 95° C. to 100° C. for about one hour. In preparing the desdimethylamino dervatives, the tetracycline methiodide may be dissolved in a suitable solvent and reduced in the presence of zinc dust and acetic acid. A number of substances are suitable as solvents in either phase of the process of this invention, e.g. tetrahydrofuran, acetone, β-methoxy ethanol, methanol, ethanol, acetic acid, etc. The several steps of the process may be run continuously in a consecutive manner or intermittently as separate and distinct steps.

The following examples will more particularly illustrate the new compounds and new processes of this invention. However, they are set forth in an illustrative sense only, the scope of the invention being limited only by the appended claims. The examples that follow are primarily directed to the methiodides of chlortetracycline and tetracycline and their reaction products wherein methyl iodide is the reagent of choice. However, other lower alkyl iodides may be used, e.g. ethyl iodide, propyl iodide, butyl iodide, etc. Additionally, the other halides are contemplated. Thus generically, the quaternary alkyl halides of this invention are deemed to be best represented by the following formula:

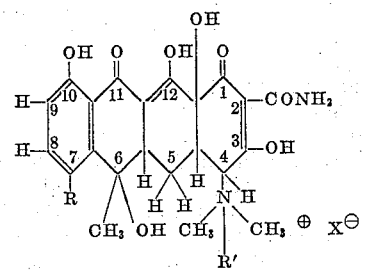

wherein R is hydrogen or chlorine, R' is lower alkyl (methyl, ethyl, etc.) and X is a halogen (F, Cl, Br, or I).

*Example 1.—Tetracycline methiodide*

Tetracycline, 2.4 grams (0.005 mole), was dissolved in 50 ml. of tetrahydrofuran. The solution was filtered and treated with an excess of methyl iodide, 6 ml., and allowed to stand at room temperature (24° C.) for three days. The resulting crystalline material was filtered and recrystallized from absolute alcohol.

Calculated for $C_{23}H_{27}N_2O_8I$; M.W. 586—Calc.: C, 47.2; H, 4.6; N, 4.8; I, 21.7. Found: C, 46.7; H, 5.3; N, 4.4; I, 22.6.

The above procedure was repeated using 100 grams of tetracycline in 2 liters of tetrahydrofuran and 240 ml. of methyl iodide. After four days, 70 grams of tetracycline methiodide were obtained. The mother liquor deposited an additional 20 grams of product on standing for an additional seven days.

*Example 2.—Chlortetracycline methiodide*

1.2 grams of chlortetracycline were dissolved in 25 ml. of tetrahydrofuran, and 3 ml. of methyl iodide were added. The solution was heated one hour at 95° C. in a sealed tube. After cooling, the yellow crystalline precipitate was filtered, washed with tetrahydrofuran, and found not to melt below 240° C. The material was dissolved in the minimum volume of hot absolute alcohol, and ½ volume of absolute alcohol was added. The solution was filtered, and 90–100° C. boiling petroleum ether was added to the filtrate until the solution became turbid. A few drops of absolute alcohol were added to clarify the solution which was then placed in the cold room. The crystals were filtered, washed with petroleum ether, and dried, giving a product melting at 225–228° C. (decomposition began).

Calculated for $C_{23}H_{26}ClN_2O_8I$—Calc.: C, 44.4; H, 4.2; N, 4.5; Cl, 5.7; I, 20.4. Found: C, 44.7; H, 4.7; N, 4.6; Cl, 5.75; I, 20.3.

*Example 3.—Chlortetracycline methiodide*

Chlortetracycline, 2.4 grams (0.005 mole), was dissolved in 50 ml. of tetrahydrofuran; 6 ml. of methyl iodide were added and the solution allowed to stand at room temperature (24° C.) for seven days. The product which separated from solution was first recrystallized from absolute alcohol and then from absolute alcohol-petroleum ether (90–100) mixture. Its infrared and ultraviolet spectra were identical with those of the product prepared by the autoclaving procedure described in Example 2.

Calculated for $C_{23}H_{26}ClN_2O_8I$—Calc.: C, 44.4; H, 4.2; N, 4.5; Cl, 5.7; I, 20.4. Found: C, 44.89; H, 4.48; N, 4.80; Cl, 5.68; I, 20.56.

*Example 4.—Chlortetracycline methiodide*

20 grams of chlortetracycline base were dissolved in 500 ml. of acetone by refluxing on a steam cone. To this solution 28.2 grams of methyl iodide were added, and the mixture was refluxed for 5½ hours, after which the mixture was allowed to stand at room temperature for 2½ days. An additional 5 ml. of methyl iodide were added, and the mixture was refluxed for an additional 8 hours, and then left overnight at room temperature. Crystals which had formed overnight were filtered, washed successively with acetone, alcohol, and ether and then dried under vacuum. Yield: 10.5 grams.

*Analysis.*—C, 43.71; H, 4.75; N, 4.62; Cl, 5.6; I, 23.62. The material assayed for 59.9 γ/mgm. The calculated values for chlortetracycline methiodide, $C_{23}H_{26}ClN_2O_8I$, are as follows: C, 44.4; H, 4.2; N, 4.5; Cl, 5.7; I, 20.4.

*Example 5.—Tetracycline methyl betaine*

5 grams of tetracycline methiodide were dissolved in 250 cc. of water by adding about 1 cc. of concentrated hydrochloric acid. The solution was clarified by filtration and sodium acetate solution was added to bring the pH to about 4–5. The product which crystallized out was filtered and dried, weighing 2.6 grams. 0.5 gram of this product was crystallized from 150 cc. of methanol; it had a melting point of about 180–186° C. with darkening.

Calculated for $C_{23}H_{26}N_2O_8 \cdot H_2O$—Calc.: C, 58.0; H, 5.8; N, 5.9. Found: (2 different samples) C, 58.51, 57.18; H, 6.20, 6.27; N, 5.97, 5.79, 5.51.

*Example 6.—Chlorotetracycline methyl betaine*

2 grams of chlortetracycline methiodide were dissolved in 5 cc. of dimethylformamide and centrifuged until clear. The solution was poured into 50 cc. of water containing 5 cc. of 20% sodium acetate. A crystalline product was slowly deposited and after standing in the chill room overnight it was filtered off and dried, weighing 0.87 gram. This material gave a negative test for iodide ion. The product was slurried in 25 cc. of water and dissolved by adding about 5 drops of 6 N $H_2SO_4$. The solution was treated with charcoal, filtered and 20% sodium acetate was added to bring the pH to 4–5. The product crystallized, was filtered off and dried at 60° C. for 2 hours in vacuo. Melting point about 195–205° C. with blackening.

Calculated for $C_{23}H_{25}N_2O_8Cl$—Calc.: C, 56.06; H, 5.1; N, 5.7; Cl, 7.2. Found: C, 55.69; H, 5.37; N, 6.28, 5.81; Cl, 7.31.

*Example 7.—Desdimethylaminotetracycline*

20 grams of tetracycline methiodide (freshly prepared) were dissolved in 300 ml. of acetic acid and 300 ml. of water. The solution was stirred rapidly, and 10 grams of zinc dust were added. The stirring was continued for 15–20 minutes, and the excess zinc was filtered off. To the clear yellow filtrate were added 2 liters of water containing 20 ml. of concentrated hydrochloric acid. A yellow precipitate formed which, after cooling for about an hour, appeared to be round aggregates of crystals. The product was filtered and dried in vacuum over phosphorus pentoxide, yield 10.43 grams. 500 mg. of this crude product were dissolved in about 40 cc. of ethyl acetate by boiling. The resulting solution was allowed to cool to about 25° C. and it was then filtered. To this filtered solution were added about 40 cc. of petroleum ether (boiling point 90°–100° C.) and the solution was then refiltered. Crystallization was induced by warming this solution to about 50° to 55° C. The resulting crystalline product was filtered off after cooling to about 25° C. It was then dried for 1 hour at about 60° C. under vacuum.

Calculated for $C_{20}H_{19}NO_8$.—Calc.: C, 59.9%; H, 4.8%; N, 3.5%. Found: C, 60.02%; H, 4.85%; N, 3.10 and 3.25%.

*Example 8.—Desdimethylaminochlortetracycline*

A solution of 24.8 grams of chlortetracycline methiodide in 200 ml. of acetic acid and 140 ml. of water was vigorously stirred with 12.0 grams of zinc dust for 15 minutes. The temperature rose a few degrees and a solid precipitated with the zinc. The combined solids were filtered off and 50 ml. of dimethylformamide were used to separate the solid product from the zinc by dissolving the solid product. Upon addition of 100 ml. of methanol and 5 ml. of 6 N hydrochloric acid to the resulting solution, 6.15 grams of crystalline product were obtained. The filtrates were concentrated to recover another 6.54 grams of crystalline product giving a total yield of 12.69 grams. This material crystallizes with 1 mole of methanol of solvation.

*Example 9.—Chlortetracycline methochloride*

Chlortetracycline methiodide, 1.2 grams (0.002 mole), was dissolved in 50 ml. of 95% ethanol by heating to boiling. The solution was cooled to about 25° C. and pulverized silver chloride, 5 grams, was added to the cooled solution. The mixture was protected from light and shaken for a total of 14 hours. The mixture was filtered, the filtrate evaporated to small volume and then diluted with ether. The crystalline product of the methochloride was obtained.

Calculated for $C_{23}H_{26}N_2O_8Cl_2$, M.W. 529.2.—Calc.: C, 52.1; H, 5.0; N, 5.3; Cl, 13.4; O, 24.2. Found: C, 51.5; H, 5.6; N, 5.9; Cl, 12.8; O, 24.2 (diff.).

We claim:
1. A compound of the group having the formula:

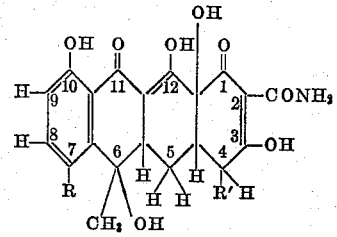

wherein R is a member of the group consisting of hydrogen and chlorine and R' is

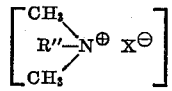

wherein R" is lower alkyl and X is a halogen.
2. The compound, chlortetracycline methiodide.
3. The compound, tetracycline methiodide.
4. The compound, chlortetracycline methochloride.

References Cited in the file of this patent

UNITED STATES PATENTS

| | | |
|---|---|---|
| 2,590,125 | Robinson | Mar. 25, 1952 |
| 2,704,289 | Hutchings | Mar. 15, 1955 |
| 2,786,077 | Stephens | Mar. 19, 1957 |

OTHER REFERENCES

Whitmore: Organic Chemistry, 2nd ed., pp. 166–7, 174 (1951). (D. Van Nostrand Co., N.Y.)

Stephens et al.: J. Am. Chem. Soc., vol. 74, Oct. 5, 1952, pp. 4976 and 4977.

Stephens et al.: J. Am. Chem. Soc., vol. 76, July 5, 1954, pp. 3573 and 3574.

Hochstein et al.: J. Am. Chem. Soc., vol. 75, Nov. 28, 1953, pp. 5467 and 5468.

Boothe et al.: Antibiotics Annual, 1953–1954, pp. 46 to 48.